Jan. 16, 1951  R. F. MOZLEY ET AL  2,538,027
AUTOMATIC AND MANUAL RANGING CIRCUITS
Filed May 14, 1943  3 Sheets-Sheet 1

INVENTORS
ROBERT F. MOZLEY
JAMES E. SHEPHERD
BY
ATTORNEY

INVENTORS
ROBERT F. MOZLEY
JAMES E. SHEPHERD
BY Paul B. Hunter
ATTORNEY

Jan. 16, 1951  R. F. MOZLEY ET AL  2,538,027
AUTOMATIC AND MANUAL RANGING CIRCUITS

Filed May 14, 1943  3 Sheets-Sheet 3

INVENTORS
ROBERT F. MOZLEY
JAMES E. SHEPHERD
BY
ATTORNEY

Patented Jan. 16, 1951

2,538,027

UNITED STATES PATENT OFFICE 2,538,027

AUTOMATIC AND MANUAL RANGING CIRCUITS

Robert F. Mozley and James E. Shepherd, Hempstead, N. Y., assignors to The Sperry Corporation, a corporation of Delaware Application May 14, 1943, Serial No. 487,046

5 Claims. (Cl. 343—7)

This application is a continuation-in-part of the copending application Serial No. 482,807, filed April 12, 1943, now Patent No. 2,495,753 issued January 31, 1950 by Robert F. Mozley for a Ground Target Eliminator.

The present invention relates to electric circuits, including current controlling devices.

An object of the invention is to provide methods and apparatus for producing and controlling moving gates.

Another object of the invention is to provide electronic control circuits.

Still another object of the invention is to provide means responsive to coincidence of two electrical signals and to provide circuits for effecting controls in response to coincidence or lack of coincidence of electrical signals.

Another object of the invention is to provide means responsive to overlap or difference in times of discontinuities of square waves.

A further object of the invention is to provide improved means responsive to the coincidence or lack of coincidence of an input signal with a reference gate.

Still another object of the invention is to provide a voltage responsive control circuit or electronic servo for causing a moving gate to correspond to a reference gate or a range step.

An additional object of the invention is to provide an improved ranging circuit which may be either manually operated or automatic and which may be transferred smoothly from automatic to manual operation and vice versa.

Other further objects and advantages will become apparent as the description proceeds.

In carrying out the invention in its preferred form, coincidence devices having two separate high-impedance inputs are utilized, for causing a moving gate or range step to correspond to a reference gate or range step which may be set to a predetermined point manually or by other apparatus. A pair of such coincidence devices or mixers is employed with a comparator responsive to relative outputs of the coincidence devices. For producing the moving gate, a square-wave generator is provided having positive and negative outputs or having an inverter for producing an inverted output and having means for varying the length of the portion of the wave having a given polarity; the positive output is fed to one mixer and the negative or inverted output is fed to the second mixer. An inversion of the reference square wave or range step is also fed to the first mixer and the direct reference wave or range step is also fed to the second mixer. In this manner, the mixer outputs represent the degree of overlap of the moving gate with respect to the reference gate; and one mixer or the other is energized, according to whether the reference wave or the moving gate is longer. A feed-back connection is made from the comparator back to the variable-length square-wave generator for adjusting its wavelength until the mixer outputs are balanced or both reduced to zero and the variable square wave corresponds to the reference wave.

When the coincidence devices or mixers are used in connection with an automatic ranging circuit with a common input from a target signal and inputs from two different contiguous range gates, moving to represent variations in range, the output of the comparator is fed back to the moving gate generator which sets the positions of the range gates for automatically ranging the target. For manually controlling the range setting, a manually controlled current source is provided for supplying a positive or negative adjustable voltage or current in place of the comparator output. A changeover switch is provided for cutting out the auxiliary current source when automatic ranging is desired. In this manner smooth transfer from automatic to manual range setting is obtained.

A better understanding of the invention will be afforded by the following detailed description when considered in connection with the accompanying drawing, and those features of the invention which are believed to be novel and patentable will be pointed out in the claims appended hereto.

In the drawing.

Like reference characters are utilized throughout the drawing to designate like parts.

Figure 1:
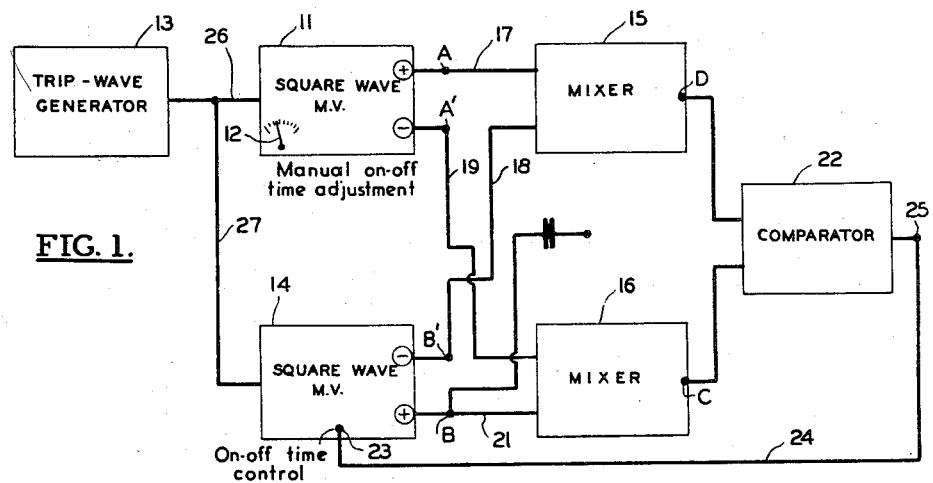
Fig. 1 is a schematic block diagram of one embodiment of the invention.

The combination of elements shown for the sake of illustration of Fig. 1 may be utilized for causing a moving gate or range step to coincide with or correspond to a reference gate or range step. Such a reference gate is represented by the graph of Fig. 2A and the movable gate is represented by Fig. 2B, the full lines representing a hypothetical incorrect setting of the moving gate.

The reference gate, Fig. 2A, may be derived from any source. For illustration, it is assumed to be produced by a square wave generator 11, Fig. 1, which may have a control handle 12 for setting the length of the square wave. The starting time of the square wave is assumed to be determined by a trip wave generator 13.

A variable wavelength square-wave generator 10 14 is provided for producing the moving gate of Fig. 2B. The reference wave, Fig. 2A, is assumed to appear at a terminal A of Fig. 1, and the square wave generator 14 is provided with a terminal B for supplying the variable square wave or moving gate.

For comparing the output of the square wave generator 14 with the reference wave and indicating insufficiency in the length of the output of the square wave generator 14, a mixer or coincidence device 15 is provided. Likewise, for comparing the two square waves and indicating excess length of the variable square wave, a mixer 16 is provided. The mixer 15 has an input connection 17 from the terminal A at which the reference wave appears and a second input connection 18 for receiving an inversion of the square wave output of the generator 14. Although an inverting stage may be interposed between the terminal B and the connection 18, for simplicity it is assumed that the generator 14 is of the type having separate terminals from which positive and negative outputs may be obtained and accordingly the connection 18 is made to a terminal B' of the generator 14 at which an inversion of the wave B is provided.

In a similar manner the mixer or coincidence device 16 has an input connection 19 from a terminal A' of the reference square wave generator 11 at which an inversion of the reference wave appears, and the mixer 16 has a second input connection 21 from the terminal B of the square wave generator 14 at which the direct wave appears.

For comparing the outputs of the mixers 15 and 16, a comparator 22 is provided having input connections from output terminals C and D of the mixers 16 and 15, respectively.

The variable square wave generator 14 is provided with a control terminal 23, the potential of which determines the length of the square wave produced thereby, and a feedback connection 24 is made from an output terminal 25 in the comparator 22 to the control terminal 23 of the square wave generator 14.

For simplicity, the reference wave and the square wave representing the moving gate are assumed to have the same starting time and both generators 11 and 14 are assumed to be synchronized by synchronizing connections 26 and 27 from the trip wave generator 13.

Figure 3:
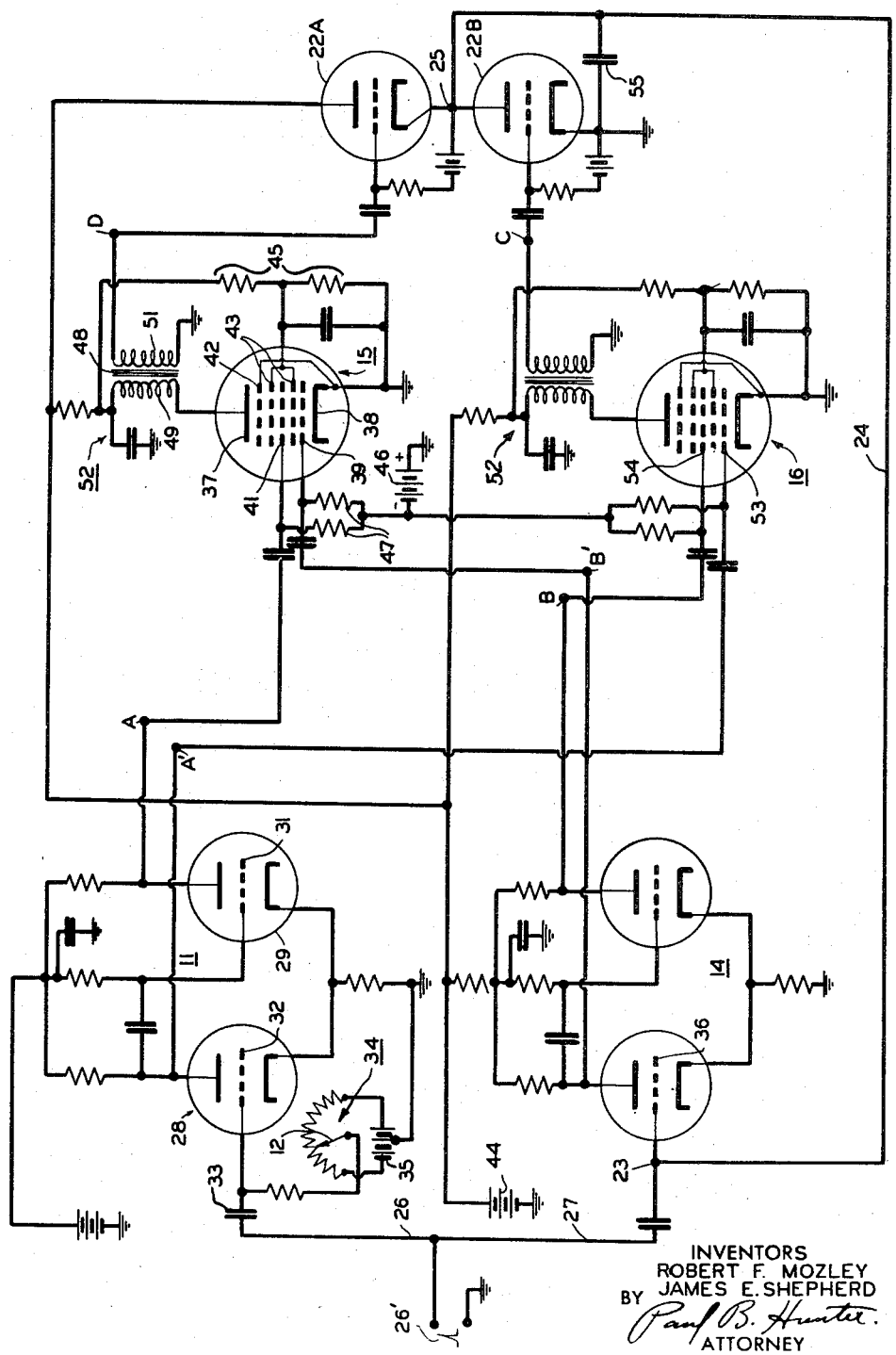
Fig. 3 is a circuit diagram corresponding to Fig. 1.

Although the invention is not limited to the use of particular circuit arrangements within the various elements of the block diagram of Fig. 1, successful results may be obtained by the use of electric discharge devices such as vacuum tubes connected in the manner illustrated in Fig. 3. The reference wave generator 11 is shown for the sake of example as comprising a single sweep cathode coupled multivibrator circuit having a first stage triode 28 and a second stage triode 29. The positive output is from the anode of the triode 29 which is connected to the terminal A, and the negative output from the triode 28 is connected to the inversion terminal A'. The triode 29 has a control grid 31 positively biased and resistance capacitance coupled in a conventional manner to the first stage triode 28. The triode 28 has a control grid 32 coupled through a condenser 33 to a pair of terminals 26' at which the trip wave is supplied by the generator 13 (not shown in Fig. 3). The length of the square wave produced by the generator 11 is determined by the bias of the control grid 32. For making the grid bias manually adjustable, if desired, a bias potentiometer 34 is provided having a control handle 12. The potentiometer 34 is shown as being connected across a conventional bias source 35.

The moving gate generator or variable length square wave generator 14 may also be a multivibrator circuit of the type shown for the reference wave generator 11. For automatically varying the length of the square wave produced by generator 14, the first stage has a control grid 36 connected to the feedback connection 24.

Although the mixers 15 and 16 may take the form of current-controlling devices or vacuum tubes having more than one grid such as tetrodes or screen grid tubes, for example, it is preferable to employ current-controlling devices each of which has a pair of control elements with high input impedance. For example, the mixers 15 and 16 may comprise a pair of pentagrid converters, such as vacuum tubes of 6SA7 type, for instance.

The pentagrid converter 15 comprises an anode 37, a cathode 38, a number 1 grid or first control electrode 39 and a number 3 grid or second control electrode 41, together with a suppressor grid 42 ordinarily tied to the cathode 38 and a pair of shield grids 43 ordinarily held at some potential below the positive potential of a power supply 44 by means of a voltage divider 45. For biasing the control grids 39 and 41 beyond cutoff, a source of negative voltage 46 is provided with suitable grid leaks 47 connected between the control grids and the negative terminal of the bias source 46. The first control grid 39 is coupled to the negative or inversion-wave output terminal B' of the square wave generator 14, and the second control grid 41 is coupled to the positive or direct-wave output terminal A of the reference wave generator 11. For inversion of the output of the converter 15, a transformer 48 is provided having a primary winding 49 in series between the anode 37 and the positive terminal of the power supply 44 and having a secondary winding 51, one end of which is grounded and the other end of which is connected to the output terminal D. It will be understood that in applications in which the square voltage wave form is to be preserved accurately, a conventional resistance coupled inversion stage may be employed instead of the transformer 48. In order that a common power supply may be utilized, conventional de-coupling capacitance-resistance elements 52 may be provided.

The pentagrid converter 16 is similar in construction and connections to the converter 15, and need not therefore be described in detail other than to point out that it has a first control element or grid 53 which is coupled to the negative terminal A' of the reference wave generator 11 and a second control element 54 which is coupled to the positive terminal B of the moving gate generator 14. Likewise, it has a transformer-coupled output terminal C.

The comparator 22 of Fig. 1 comprises a pair of current-controlling devices such as triodes 22A and 22B (Fig. 3) having input circuits resistance-capacitators coupled to the output terminals D and C respectively of the pentagrid mixers or coincidence devices 15 and 16. The triodes 22A and 22B are connected in series with a junction terminal which is also the output terminal 25. For stabilizing the output potential, a condenser 55 may be provided, which may be connected between the junction terminal 25 and a suitable reference point such as ground.

Figure 2:
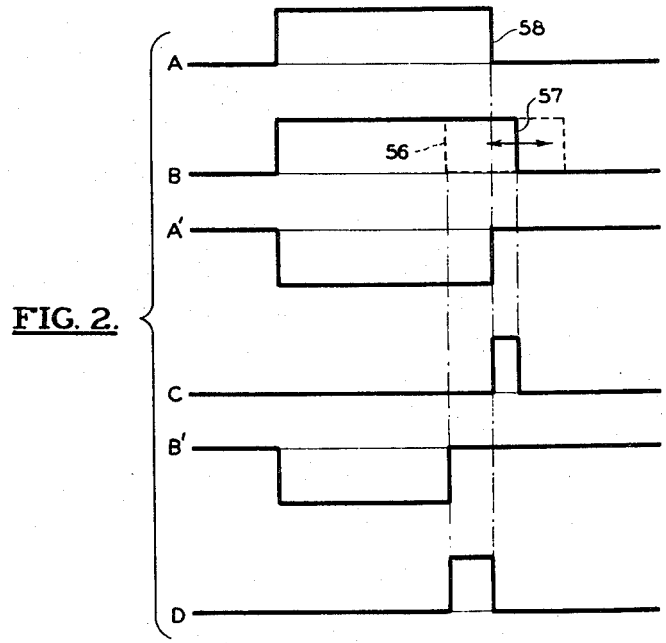
Fig. 2 is a set of graphs explanatory of the principle of operation of the apparatus of Fig. 1.

The principle involved in the operation of the circuit of Fig. 3 will be understood more readily from a consideration of the graphs of Fig. 2. Assume that the moving gate B, as shown in Fig. 2, is greater in length than the reference square wave A. The inversion of the wave A is shown at Fig. 2A'. The wave A' combined with the wave B in the coincidence device 16 results in an output wave, Fig. 2C, from the mixer 16. On the other hand, if the moving gate of Fig. 2B had been a square wave of insufficient length as represented by a trailing edge 56 shown in dotted lines, the inversion of this wave shown at Fig. 2B' compared with the direct wave, Fig. 2A, would result in an output wave D from the coincidence device 15. According to whether the coincidence device 15 or 16 is energized, an output will be supplied to the comparator triode 22A or 22B. Assuming the original case in which the wave B was of excess length producing an output C from the device 16, the triode 22B will be energized, decreasing its impedance, partially discharging the condenser 55, and lowering the potential of output terminal 25. The reduced potential is fed back through the feedback connection 24 to the control grid 36 of the variable length square wave generator 14 reducing the bias and thereby reducing the length of the square wave output until the length of the output wave, Fig. 2C, is reduced to zero. This either balances the impedances of the triodes 22A and 22B or permits both triodes to remain cut off and makes the length of the wave, Fig. 2B, coincide with the length of the reference wave, Fig. 2A. Conversely, if the pulse wave of Fig. 2B is of insufficient length, the triode 22A is energized, decreasing its impedance and raising the potential of the output terminal 25 until a balanced condition is produced.

The use of pentagrid converters as coincidence devices results in independent control of current flow through the coincidence devices by the signals applied to the control elements. The plate current is controlled to almost the same extent by a voltage on either control grid. In the case of the tube 15, the grid 39 controls the actual electron current leaving the cathode 38, while the grid 41 has little effect on the current leaving the cathode but when it becomes negative, switches this current from the anode 37 to the shield grids 43. As a result, either grid 39 or 41 can be used to cut off the plate current. Although the plate current is a function of the voltages on both grids, the negative grid voltage on either control grid required to cut off plate current is independent of the grid voltage on the other control grid.

For instance, in a 6SA7 tube, if the control grid 39 is biased to about 20 volts below the cathode, no plate current will flow no matter what voltages are applied to the grid 41 (within limits of 100-150 volts). If the grid 41 is biased to about 20 volts below the cathode, no plate current will flow no matter what voltages are applied to the grid 39 (within limits of 100-150 volts).

If the tube is biased with both control grids below cut-off, plate current will flow only when a positive voltage appears on both grids simultaneously. The tube will, for this reason, detect the coincidence of two positive pulses or square waves since current will flow only when both pulses occur at the same time, or when both square waves are positive at the same time. It can also be used in the same way to measure the difference in the times of the discontinuities of the two square waves (Fig. 2).

Another advantage of a pentagrid converter is that both the grid 39 and the grid 41 provide high input impedance. The shield grids 43 are effective in reducing the input capacitances of both the control grids 39 and 41. As a result, the plate load affects only the shape of the output pulse or square wave and does not affect the accuracy of the detection of coincidence except for the very slight difference it may make in the input capacitance and thus the input wave shape. The apparatus operates effectively even with relatively weak signals applied to both control grids 39 and 41. There is little coupling between the two control grids. Neither grid draws appreciable current and the two grids are shielded from each other by the shield grids 43. Both grids not only have high gain but give linear outputs in the anode circuit.

The apparatus of Figs. 1 and 2 may be utilized in any application where it is desired to cause a wave of variable length to be brought into coincidence automatically with a reference wave, or where it is desired to cause a range step to come into line with a reference range step. For example, the trailing edge 57 of Fig. 2B may correspond to the moving range step and the trailing edge 58 of the reference wave, Fig. 2A, may represent a reference range step.

Although the invention is not limited to a particular application, it may be found useful, for example, when an automatic ranging circuit producing a moving range step 57 is to be caused to line up automatically with a range step 58 which is adjusted manually in order to select a desired target as in target ranging devices of the micro-wave pulse type. Such a system may be applied to a conventional pulse micro-wave receiver and ranging system without making any changes therein.

Figure 4:
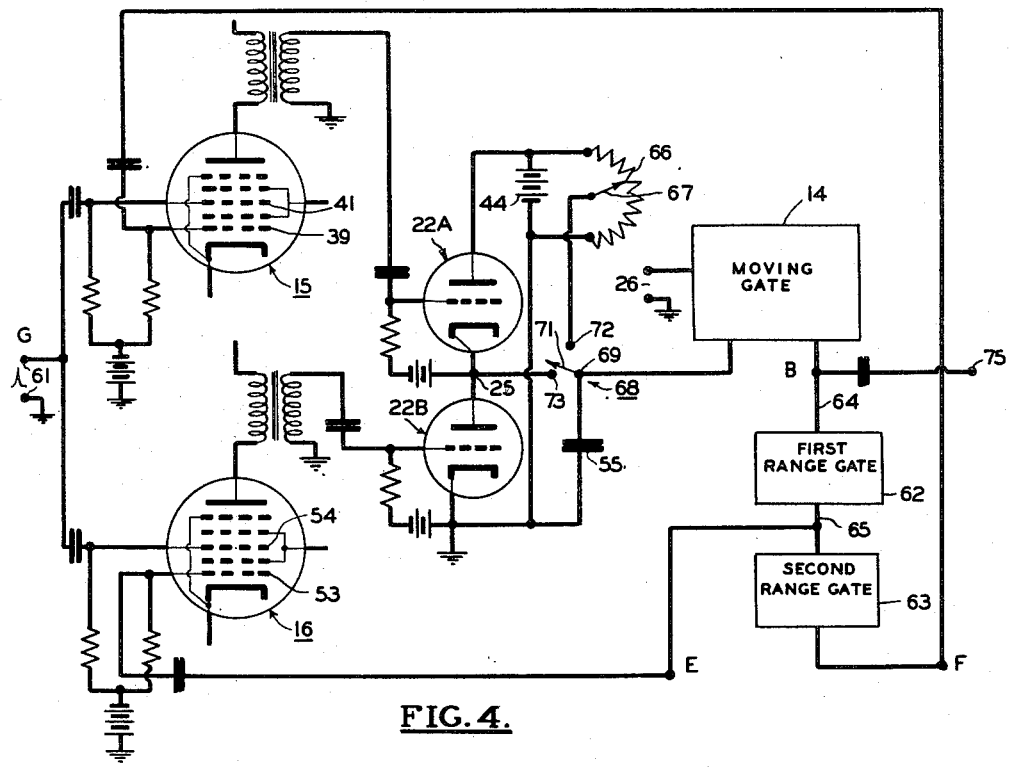
Fig. 4 is a simplified circuit diagram, partially schematic, of another embodiment of the invention.

A combined automatic and manual range setting system may also be arranged utilizing coincidence devices as shown in Fig. 4. In this case, the same type of coincidence devices 15 and 16 is employed and a similar comparator consisting of triodes 22A and 22B may be utilized. Although additional vacuum tube stages may be provided for improving the operation, such stages have been omitted from the present application for simplifying the drawings. In this case, a pair of input terminals 61 is provided at which a signal from a micro-wave pulse receiver (not shown) is supplied whenever a target is located by a pulsed microwave scanning system. In the apparatus of Fig. 4 it may be desirable to operate the grids at different bias potentials. Particularly in case of weak input signals to the terminals 61, it may be advantageous to bias the grids 41 and 54 at or above cut-off potential. A moving gate generator 14 responsive to the output of the comparator 22 is provided, and a pair of range gate generators 62 and 63 is also provided. The range gate generator 62 is coupled to the output of the moving gate generator 14 through a connection 64 to cause the range gate output of the generator 62 to start on the trailing edge of the output of generator 14. Likewise, the range gate generator 63 is coupled to the output of the generator 62 through a connection 65 for causing a second range gate to start on the trailing edge of the output of the range gate generator 62. The output of the first range-gate generator 62 is coupled to one of the control grids, e. g., the control grid 53 of the coincidence device 16, and the output of the second range-gate generator 63 is coupled to one of the control grids, e. g., the control grid 39 of the coincidence device 15. The ungrounded signal input terminal 61 is coupled to one control grid of each of the devices 15 and 16, viz., to the grids 41 and 54.

For providing manual control of range setting and overcoming the automatic control, an adjustable current source is provided to change the potential of the condenser 55. Such a current source may take the form of a potentiometer 66. As shown, the potentiometer 66 is energized by connecting it across the common power supply 44 and it has a movable tap 67 connected through a double-throw switch 68 to the positive terminal 69 of the condenser 55. The switch 68 is shown as comprising a movable contact or blade 71 connected to the condenser terminal 69, a stationary contact 72 connected to the potentiometer tap 67, and a second stationary contact 73 connected to the comparator output terminal 25.

Figure 5:
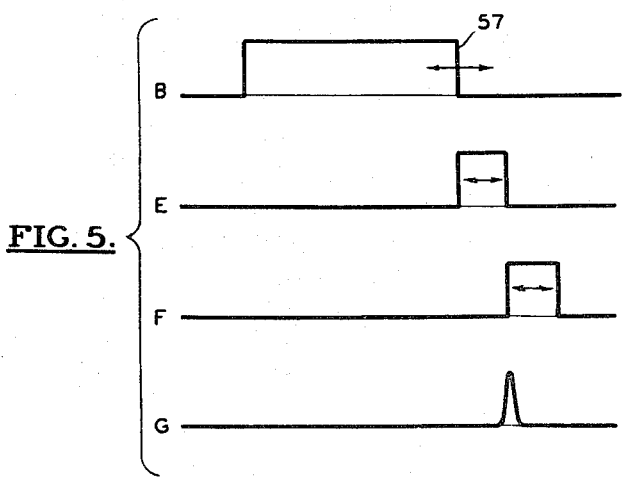
Fig. 5 is a set of graphs explanatory of the operation of the apparatus of Fig. 4.

When the switch 68 is in the position shown for producing automatic range setting, viz., with the blade 71 against the contact 73, the range gate shown in Fig. 5B varies in length with the trailing edge 57 moving to the right or left according to variations in the range of a target producing a reflected signal supplied to the signal input terminals 61. Since the range gate generators 62 and 63 are synchronized with the moving gate generator 14, the range gates shown in Fig. 5E and Fig. 5F also move to the right or to the left together with the trailing edge 57 of the moving gate Fig. 5B. With this action the signal shown in Fig. 5G coincides to a greater extent with one range gate, E or F, than with the other if the length of the moving gate 57 is incorrect. For example, if the moving gate B is too long, the signal, Fig. 5G, will coincide with the first range gate, Fig. 5E, causing the coincidence tube 16 to become conducting whereas the tube 15 remains non-conducting. Only the tube 16 can supply an output, which energizes the comparator tube 22B reducing its impedance and causing the potential of the output terminal 25 to fall, decreasing the bias of the moving gate generator 14 thereby causing the length of the range gate 57 to decrease. This action continues until the signal shown in Fig. 5G is split evenly between the first and second range gates of Figs. 5E and 5F. An output terminal 75 may be coupled to the moving gate generator terminal B for supplying an indicator or other apparatus desired to be responsive to target range.

If manual range setting is desired, the switch 68 is moved to the opposite position, with the blade 71 against the contact 72, and the range setting condenser 55 is charged or discharged according to the setting of the potentiometer tap 67. The capacitance of the condenser 55 provides sufficient "mass" effect to prevent abrupt variations in the circuit when the switch 68 is manipulated.

When the apparatus is to be used for automatically tracking one of several different targets in range, the switch 68 is first moved to the manual range-setting position, and the tap 67 is adjusted until the range has been set manually to bring a reflection signal from the desired target into the input terminals 61. The switch 68 is then moved to the position shown, and the apparatus continues to track the selected target automatically.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for bringing a moving gate into coincidence with a square wave reference voltage comprising in combination input terminals at which a square wave reference voltage appears, a moving gate generator having a gate length varying terminal; and a voltage responsive control circuit, said control circuit comprising means for comparing the reference square wave with the moving gate and generating a voltage dependent in magnitude on any difference in length between said moving gate and said reference square wave, and connections for supplying said voltage to the gate length varying terminal of the moving gate generator.

2. Pulse timing control apparatus comprising a recurrent pulse generator having a pulse length control terminal and an output circuit and arranged for producing periodically initiated output pulses of duration controlled in accordance with the voltage applied to said pulse length control terminal, first and second signal coincidence devices each having two signal input circuits and each device arranged to produce an output signal dependent upon simultaneous input signal intensities applied to the two signal input circuits thereof, means for applying to one input circuit of each of said coincidence devices periodic impulses in accordance with which the duration of said generator output pulses is to be controlled, means coupling said pulse generator output circuit to the other input circuit of each of said coincidence devices, said last-named means being so arranged as to produce differential variations of the coincidence device output signals upon variation of the relative timing of said periodic impulses and said generator output pulses, and means for applying voltage to said pulse length control terminal comprising first and second electron discharge devices each having a cathode and an anode and a control electrode, the cathode and anode circuit of one of said electron discharge devices being connected in series with the cathode and anode circuit of the other of said electron discharge devices and in series with an anode potential source, the control electrode of said first electron discharge device being coupled to said first signal coincidence device, the control electrode of said second electron discharge device being coupled to said second signal coincidence device, and the junction of the series-connected anode and cathode circuits of said first and second electron discharge devices being coupled to said pulse length control terminal.

3. A system for comparing the lengths or durations of two square waves or the like, wherein said waves are generated by separate sources which initiate the respective waves simultaneously, including two mixer circuits each having two input terminals and an output terminal, means applying one of said waves in one polarity to one input terminal of one of said mixer circuits and in the opposite polarity to the corresponding input terminal of the other of said mixer circuits, means applying the other of said waves in opposite polarities respectively to the other input terminals of said mixer circuits, and means responsive to the outputs of both of said mixers to produce a voltage whose magnitude depends upon the difference in the durations of said waves.

4. The invention as set forth in claim 3, wherein said last mentioned means includes first and second electron discharge devices each including at least a cathode, an anode, and a control electrode, the cathode and anode circuits of said discharge devices being connected in series with each other, and means applying the outputs of said mixer circuits respectively to said control electrodes, whereby the average potential at the junction of the series connected anode and cathode circuits of said first and second discharge devices is a measure of said difference in duration of said waves.

5. The invention as set forth in claim 4, further including means responsive to said potential to adjust one of said sources to make one of said waves conform in length with the other of said waves.

ROBERT F. MOZLEY.
JAMES E. SHEPHERD.

REFERENCES CITED

The following references are of record in the file of this patent:

UNITED STATES PATENTS

| Number | Name | Date |
|---|---|---|
| 2,183,399 | Heising | Dec. 12, 1939 |
| 2,221,115 | Shepard, Jr. | Nov. 12, 1940 |
| 2,455,265 | Norgaard | Nov. 30, 1948 |